Jan. 24, 1939.   F. A. BENT   2,144,750
PROCESS FOR THE PRODUCTION OF HYDRATED OLEFINES
Filed March 5, 1934
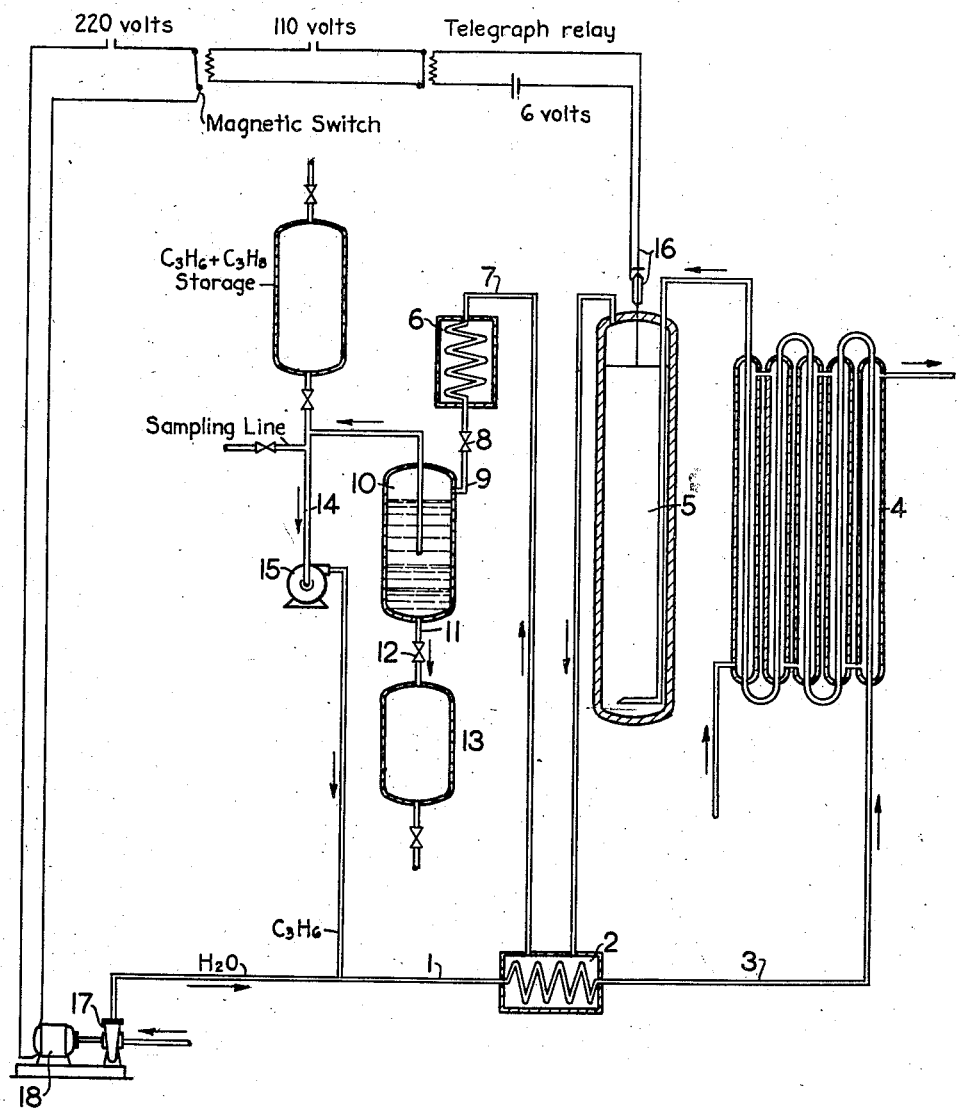
Inventor: Franklin A. Bent
By his Attorney: Arthur B Bakalar Patented Jan. 24, 1939

2,144,750

UNITED STATES PATENT OFFICE 2,144,750

PROCESS FOR THE PRODUCTION OF HYDRATED OLEFINES

Franklin A. Bent, Berkeley, Calif., assignor to Shell Development Company, San Francisco, Calif., a corporation of Delaware Application March 5, 1934, Serial No. 714,002

15 Claims. (Cl. 260—641)

This invention relates to a process for the catalytic hydration of olefines, and more particularly is concerned with those systems wherein the catalyst is in the liquid phase comprising water while the temperature is above 100° C.

In an earlier application filed by F. A. Bent, January 14, 1931, Serial No. 508,809, the catalytic influence of the sulfates of beryllium, zinc and magnesium is emphasized.

I have found that when operating with dilute sulfuric acid, other conditions being equal, the sulfuric acid is just as effective as any one of the above sulfates at lower temperatures and concentrations. I have determined, for example, that about 5% $H_2SO_4$ in the liquid phase at 3000 pounds pressure and at a temperature of 225° C. is substantially equivalent in catalytic activity to an 8% aqueous zinc sulfate solution at 278° C. and under the same pressure. However, sulfuric acid per se is conducive to corrosion of the equipment, polymerization of the olefines, and favors side reactions due to its oxidizing character.

I have discovered that the valuable effects of dilute sulfuric acid may be commercially utilized without its attendant disadvantages by resorting to one or both of my improved procedures.

If the converter, in which the hydration reaction is executed, is constructed of or lined with a metal whose normal electrode potential is between +0.2 and —0.4 on the scale in which the normal electrode potential of hydrogen is 0, or with an alloy predominating in said metal or metals, such as copper or alloys predominating in copper, the disadvantages attendant with the employment of sulfuric acid are obviated. Not only is this true with sulfuric acid, but it also holds for the organic sulfonic acids, phosphoric acid, hydrochloric acid, boric acid, acetic acid and the like. The selected metal or alloy thereof is substantially unreactive with dilute free acid; therefore the concentration of free acid remains unimpaired. When employing catalytic salts, whether of acid or neutral character, as solutions or suspensions as sulfates, acid sulfates, halides, nitrates, phosphates, pyrophosphates, etc., the copper surface and the like limits the hydrolysis of the salts to the hydrolysis that is characteristic of the salts, their concentrations, and the temperatures, thereby maintaining the effective salt concentration.

In lieu of the construction material or in addition thereto, one may effectively utilize an aqueous solution or suspension of one or more sulfates as those of beryllium, magnesium, zinc, cadmium, aluminum, manganese, chromium, cobalt and nickel. These sulfates are employed in the presence of free sulfuric acid in the liquid phase at temperatures ranging from 100° C. to about 374° C. or just below the critical temperature of water. Not only do these sulfates suppress the formation of polymers, but the free acid simultaneously prevents the hydrolysis of the sulfates, thereby maintaining the salt concentration.

A very slight amount of acid is sufficient to cause the catalytic hydration of olefines. The rate of reaction increases with the concentration of the catalyzing acid, but this advantage is offset by side reactions, polymerization of the olefines, etc. The concentration of free acid will vary with the character and concentration of the olefine undergoing hydration, with the rate of feed of the reactants, with the temperature, etc. A practical range of concentration is from about 0.1 to 15% $H_2SO_4$ although I have obtained very good results in a narrower range from about 0.1 to 10% $H_2SO_4$ and also from about 0.1 to 5% $H_2SO_4$. Less acid is required when one or more of the above-mentioned salts are present while, at the same time, a higher rate of reaction is achieved.

The operating temperature will depend on the olefine undergoing hydration and on the nature and concentration of the catalyst. A suitable range is from about 100° to 374° C. The temperatures approaching the critical temperature of water while favoring higher reaction rates also favor dehydration of the alcohols formed and result in lower alcohol percentages in the end-product if the pressure is constant. A practical intermediate range is from about 150° to 300° C.

The pressure will always be superatmospheric with a lower limit slightly above the vapor pressure of water at the operating temperature. Consequently, water will always be present in the liquid phase. This does not mean that all the water of replacement which is intermittently or continuously supplied to the converter need be in the liquid state. Only that percentage of water need be supplied in the liquid state as is calculated to hydrate the olefine or olefines; if less or none at all is supplied in the liquid state, the converter must also be operated as a condenser. The remaining water may be added in the liquid state or as water vapor or steam. Excess of water above stoichiometrical requirements must be supplied from time to time as the alcohol formed and unconverted hydrocarbons carry off with them varying quantities of water-vapor thus destroying the concentration and useful activity of the catalyst. As the pressure on the system is increased, the throughput can be increased resulting in greater mechanical efficiency of the converter. Pressures as high as 10,000 lbs. per square inch can be resorted to.

The process is applicable to normal, secondary and/or tertiary olefines, preferably those which are normally gaseous as ethylene, propylene, butene-1, butene-2, and gamma butylene. One may operate with pure olefine or admixtures thereof. Instead of pure compounds, one may work with impure individual compounds or their admixtures such as occur in the cracking or pyrolytic treatment of petroleum products and other natural carboniferous materials. Suitable fractions may be employed, such as paraffin and olefine hydrocarbons consisting predominantly of the same number of carbon atoms to the molecule, such as an ethane-ethylene, propane-propylene and butane-butylene fraction. Where desired, the tertiary olefine content may be first selectively removed prior to the hydration of the normal or secondary olefines. The presence of paraffin hydrocarbons or of other inert gases is useful in that the sweeping out effect of the inert gases in olefine admixtures tends to destroy the condition of equilibrium between the alcohol in the vapor and liquid phases in the converter by the removal of alcohol and in this way promotes the reaction of olefine with water in the desired direction. The olefine or olefines may be preheated either by heat exchange or by conventional means prior to introduction into the converter and preferably bubbled through a static liquid body of catalytic material therein comprising liquid water. The concentration of olefine in the feed is of little importance as I have determined that the rate of reaction is practically unaffected thereby.

While I have spoken of sulfates per se, the same results may be obtained by adding compounds of the above metals to the dilute aqueous acid which will react with the free acid to yield the corresponding sulfates. In such cases, an additional quantity of free acid should be initially used, the excess being equivalent to the stoichiometric amount involved in the reaction. By sulfates, I intend not only those neutral salts possessing the $SO_4$ radical, but also the acid sulfates, the pyrosulfates, the persulfates, etc., as well as their complex salts. Preferably only those are employed which are at least moderately soluble in water or form colloidal suspensions and the like.

By way of illustration only, reference will be had to the following examples which disclose several specific modes of executing my process:

EXAMPLE I

Table I.—286° C. and 3000 lbs. pressure/gauge

| Run No | 1 | 2 | 3 | 4 | 5 | 6 |
|---|---|---|---|---|---|---|
| Converter lining | Iron | Copper | Copper | Iron | Copper | Copper |
| Initial catalyst conc. $ZnSO_4.7H_2O$ | 4.00% | 4.00% | 4.00% | 4.00% | 4.00% | 4.00% |
| Free $H_2SO_4$ added | 0.00% | 1.25% | 1.26% | 1.30% | 1.30% | 0.00% |
| Time of experiment | 30 min. | 15 min. | 32 min. | 16 min. | 16 min. | 12 min. |
| Rate of hydrocarbon feed, mols hydrocarbon/minute | 1.74 | 1.71 | 1.65 | 3.21 | 3.34 | 3.80 |
| Concentration of inlet $C_3H_6$, remainder practically $C_3H_8$ | 37.5% | 35.9% | 28.7% | 33.7% | 38.3% | 33.7% |
| Conversion: $C_3H_6$ to $C_3H_7OH$ | 7.1 | 12.1 | 12.8 | 4.8 | 12.9 | 11.3 |

Discussion of results: Comparing run 3 with run 5, using a rate of feed of approximately one-half the rate of feed used in run 5, it is to be noted that the conversion obtained at the high rate is substantially equal to that obtained using a lower rate. Comparing run 6 with run 4, the influence of the copper lining is to be noted while comparing run 5 with run 6, the influence of the dilute acid is to be noted.

EXAMPLE II

Table II.—286° C. and 3000 lbs. pressure/gauge— copper lined converter

| Run No | 1A | 2A | 3A |
|---|---|---|---|
| Initial catalyst concentration $ZnSO_4.7H_2O$ | 8.00% | 8.00% | 0.00% |
| Free $H_2SO_4$ added | 0.64% | 0.00% | 1.41% |
| Rate of hydrocarbon feed, mols hydrocarbon/minute | 3.56 | 3.76 | 3.71 |
| Concentration of inlet $C_3H_6$ | 30.3 | 27.9 | 35.1 |
| Conversion: $C_3H_6$ to $C_3H_7OH$ | 12.2 | 11.6 | 11.7 |

EXAMPLE III

Table III.—3000 lbs. pressure/gauge

| Run No | 1B | 2B |
|---|---|---|
| Temperature | 286° C. | 225° C. |
| Initial catalyst concentration: | | |
| $ZnSO_4.7H_2O$ | 8.0% | 8.0% |
| $H_2SO_4$ | 0.0% | 13.1% |
| Rate of hydrocarbon feed, mols hydrocarbon/minute | 3.76 | 3.61 |
| Percent $C_3H_6$—inlet gas | 27.9 | 33.9 |
| Conversion: $C_3H_6$ to $C_3H_7OH$ | 11.6 | 13.7 |

The invention will be further described in connection with the accompanying drawing, which illustrates in a diagrammatic manner apparatus embodying the invention and adapted for the practice of the process of the invention.

In the accompanying drawing, a mixture of olefine and paraffin hydrocarbons and water are premixed at 1 and sent to a heat exchanger 2 where they pass in countercurrent heat exchange with effluent material from the converter in the vapor phase. With the admixture of olefine and water is part of the totally condensed effluent material from the converter predominantly comprising the stratified hydrocarbon phase containing unconverted olefine. The reactants issuing from the preheater 2 are in the vapor and liquid phases and flow on to a secondary heater 4 wherein they are preferably brought into heat exchange with a heat transmission agent as diphenyl and/or diphenyl oxide and the like. The vapors of heat transmission agent are generated in a boiler (not shown) and preferably flow countercurrently to the hydrocarbon and water mixture. The secondary heater 4 vaporizes all of the remaining liquid hydrocarbon and part of the liquid water. The quantity of water present in the liquid state issuing from heater 4 is at least stoichiometrictlly equivalent to the quantity of olefine to be hydrated. The mixture of vapors and/or gases with liquid water is forced into a converter 5, preferably lined with copper through a perforated copper pipe at the bottom of the converter. The operating temperature in the converter has been chosen to be about 225° C., and the pressure about 3000 pounds gauge. The temperature in the converter is maintained by suitable heating means (not shown). The converter is filled to a predetermined level with dilute $H_2SO_4$ of about 5% concentration and maintained at said level by a suitable automatic levelling device. We have found that the total volume of catalytic material in the liquid phase as well as its concentration plays an important role in the conversion of olefine per pass and that a decrease in concentration and/or volume, once the operating conditions have been established, tend or tends to reduce the percentage conversion of olefine per pass. It is for this reason that liquid water is directly introduced into the converter to replace the liquid water removed as alcohol. The incoming material is preferably introduced at or near the bottom of the liquid catalyst so that the full time of contact may be availed of. Water vapor, alcohol, unconverted olefine, paraffin hydrocarbon and inert gases, if present, issue from the converter and preferably flow in indirect heat exchange with the premixed olefine and water. After issuing from the heat exchanger 2, the effluent material is introduced via line 7 into a pressure condenser 6 wherein the material is cooled to a temperature whereat total condensation of the material is effected. The material in the liquid state flows past control valve 8 in line 9 into a receiver 10. As the materials have been cooled to approximately 25° C. in the case of a propane-propylene mixture, the existing pressure in the converter is about 150 pounds gauge—the vapor pressure of the hydrocarbon at 25° C. Due to the immiscibility of isopropyl alcohol and water with hydrocarbons, the propane and unconverted propylene form a hydrocarbon phase substantially devoid of alcohol and water while an aqueous phase containing substantially all of the alcohol is present in the lower part of the receiver. In those cases where the alcohols formed are water-insoluble and soluble in hydrocarbons, the aqueous phase will be substantially devoid of alcohol and will comprise the lower phase. In the present case, the aqueous phase is drawn off, either intermittently or continuously via line 11 and valve 12 for storage in vessel 13 from which the dilute alcohol can be removed and concentrated. With hydrocarbon-soluble alcohols, the hydrocarbon phase would be removed, the alcohols recovered therefrom as by distillation, extraction and the like and the remaining hydrocarbons treated substantially as accorded the propane-propene phase, at the same time removing water from the receiver. The hydrocarbon phase, substantially devoid of alcohol, and in the liquid state, is withdrawn from the receiver and admixed with fresh olefinic material in line 14 and pump 15 and the cycle repeated or the hydrocarbon phase is recirculated until the desired conversion of olefine to alcohol is attained. Vents or valves may be suitably positioned to prevent the accumulation of inert material in the system.

The water which is pumped by a high pressure liquid pumping system 17 is automatically controlled as to rate of feed. The water feed pump is automatically controlled by an electric device 16 which governs the electric motor 18 which drives pump 17 and so maintains a constant level of the catalyst liquid in the converter. The water is pumped in to replace the water which has been used to make alcohol and the water which has been removed with the effluent gas. When the level of the catalyst liquid in the converter falls, the water pump operates and pumps water to the desired level. When the level of the catalyst liquid in the converter is restored, the water pump ceases to operate. Instead of being connected to the pumping system, the automatic levelling device may control valve or valves in the water supply line for the same purpose.

Although I do not restrict myself to any specific control device, a short description will be had of the device illustrated. The levelling device 16 consists of a platinum rod which extends through the top flange of the converter to come in contact with the surface of the catalyst liquid in the converter. The platinum rod is enclosed in a water-cooled pressure fitting passing through the converter top flange. The platinum rod is insulated from the converter and forms one terminal of an electric circuit from a battery; the wall of the converter comprises the other terminal of the electric circuit. When the catalyst liquid in the converter is in contact with the tip of the platinum rod, an electric current from the battery flows through the platinum rod, through the electrically conducting catalyst liquid, through the walls of the converter and through an electric relay back to the battery. The electric relay makes or breaks the current supplied to the motor which drives the water feed pump.

The above description is intended to disclose a preferred mode of continuous operation with a propane-propylene mixture and is not intended to be limitative as regards the location of the various apparatus, their structure or their attendant operating conditions which are quite flexible and dependent on several interdependent factors as previously disclosed.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process of catalytically hydrating an olefine which comprises hydrating the olefine at a temperature above 100° C. and at a superatmospheric pressure of at least several atmospheres sufficient to cause the simultaneous transformation of a part of said olefine to the corresponding alcohol and simultaneous volatilization of said alcohol with the unreacted olefine in the presence of a small amount of a hydration catalyst of substantially uniform concentration and liquid water in a converter whose inner face is predominantly composed of a metal whose normal electrode potential is between +0.2 and −0.4 on the scale in which the normal electrode potential of hydrogen is 0.

2. A process of catalytically hydrating an olefine which comprises hydrating the olefine at a temperature above 100° C. and at a superatmospheric pressure of at least several atmospheres sufficient to cause the simultaneous transformation of a part of said olefine to the corresponding alcohol and simultaneous volatilization of said alcohol with the unreacted olefine in the presence of a small amount of dilute aqueous sulfuric acid in the liquid phase of substantially uniform concentration in a converter whose inner face is predominantly composed of a metal whose normal electrode potential is between +0.2 and −0.4 on the scale in which the normal electrode potential of hydrogen is 0.

3. A process of catalytically hydrating an olefine which comprises hydrating the olefine at a temperature above 100° C. and at a superatmospheric pressure of at least several atmospheres sufficient to cause the simultaneous transformation of a part of said olefine to the corresponding alcohol and simultaneous volatilization of said alcohol with the unreacted olefine in the presence of a small amount of a hydration catalyst of substantially uniform concentration and liquid water in a converter whose inner face is predominantly composed of copper.

4. A process of catalytically hydrating an olefine which comprises hydrating the olefine at a temperature above 100° C. and at a superatmospheric pressure of at least several atmospheres sufficient to cause the simultaneous transformation of a part of said olefine to the corresponding alcohol and simultaneous volatilization of said alcohol with the unreacted olefine in the presence of a catalytic amount of dilute aqueous sulfuric acid in the liquid phase of substantially uniform concentration in a converter whose inner face is predominantly composed of copper.

5. A process of catalytically hydrating an olefine which comprises hydrating the olefine at a temperature above 100° C. and at a superatmospheric pressure of at least several atmospheres sufficient to cause the simultaneous transformation of a part of said olefine to the corresponding alcohol and simultaneous volatilization of said alcohol with the unreacted olefine in the presence of a catalytic amount of dilute aqueous sulfuric acid in the liquid phase of substantially uniform concentration in a converter whose inner face is composed of an alloy of copper predominating in copper.

6. A process of catalytically hydrating an olefine which comprises hydrating the olefine at a temperature above 100° C. and at a superatmospheric pressure of at least several atmospheres sufficient to cause the simultaneous transformation of a part of said olefine to the corresponding alcohol and simultaneous volatilization of said alcohol with the unreacted olefine in the presence of a catalytic amount of dilute aqueous sulfuric acid in the liquid phase of substantially uniform concentration of less than 15%, and a sulfate of the metals: beryllium, magnesium, zinc, cadmium, aluminum, manganese, chromium, cobalt and nickel.

7. A process of catalytically hydrating an olefine which comprises hydrating the olefine at a temperature above 100° C., and at a superatmospheric pressure of at least several atmospheres sufficient to cause the simultaneous transformation of a part of said olefine to the corresponding alcohol and simultaneous volatilization of said alcohol with the unreacted olefine in the presence of a catalytic amount of dilute aqueous sulfuric acid in the liquid phase of substantially uniform concentration of less than 10% concentration and a sulfate of the metals: beryllium, magnesium, zinc, cadmium, aluminum, manganese, chromium, cobalt and nickel.

8. A process of catalytically hydrating an olefine which comprises hydrating an olefine at a temperature above 100° C., and at a superatmospheric pressure of at least several atmospheres sufficient to cause the simultaneous transformation of a part of said olefine to the corresponding alcohol and simultaneous volatilization of said alcohol with the unreacted olefine in the presence of a catalytic amount of dilute aqueous sulfuric acid in the liquid phase of substantially uniform concentration of less than 5% concentration and a sulfate of the metals: beryllium, magnesium, zinc, cadmium, aluminum, manganese, chromium, cobalt and nickel.

9. In a process of catalytically hydrating an olefine at above 100° C., and at a superatmospheric pressure of at least several atmospheres in the presence of a small amount of a hydration catalyst of substantially uniform concentration of the class consisting of sulfuric acid and sulfates of beryllium, magnesium, zinc, cadmium, aluminum, manganese, chromium, cobalt and nickel and water in the liquid phase, the step of adding water in the liquid phase to the materials in a converter in an amount at least stoichiometrically equivalent to the alcohol formed per pass while executing the reaction.

10. A process of catalytically hydrating an olefine which comprises directly hydrating the olefine at a temperature between about 150° C. and about 300° C. and at a superatmospheric pressure of at least several atmospheres greater than the vapor pressure of water at the operating temperature in the presence of a catalytic amount of a hydration catalyst of substantially uniform concentration and water in a converter whose inner face is predominantly composed of copper.

11. A process of catalytically hydrating ethylene which comprises directly hydrating ethylene at a temperature between about 150° C. and about 300° C. and at a superatmospheric pressure of at least several atmospheres greater than the vapor pressure of water at the operating temperature in the presence of a catalytic amount of a hydration catalyst of substantially uniform concentration and water in a converter whose inner face is predominantly composed of copper.

12. A process of catalytically hydrating an olefine which comprises directly hydrating the olefine under superatmospheric pressure of at least several atmospheres and at an elevated temperature sufficient to effect the hydration of the olefine in the presence of a catalytic amount of dilute aqueous sulfuric acid in the liquid phase of substantially uniform concentration and a sulfate of a metal of the beryllium sub-group of atomic number not greater than 48.

13. A process of catalytically hydrating propylene which comprises directly hydrating propylene at a temperature between about 150° C. and about 300° C. and a pressure greater than the vapor pressure of water at the operating temperature in the presence of a catalytic amount of aqueous sulfuric acid in a converter whose inner face is predominantly composed of copper, passing propylene together with water in the liquid phase in an amount at least stoichiometrically equivalent to the propylene in heat exchange with the effluent vapors from the converter and recovering isopropyl alcohol from said effluent vapors.

14. A process of catalytically hydrating an olefine which comprises directly hydrating the olefine at a temperature between about 150° C. and about 300° C., and at a superatmospheric pressure greater than the vapor pressure of water at the operating temperature in the presence of a salt of zinc having an acid character in water in a converter whose inner face is predominantly composed of copper.

15. A process of catalytically hydrating an olefine which comprises directly hydrating the olefine under superatmospheric pressure and at an elevated temperature sufficient to effect the hydration of the olefine in the presence of dilute aqueous sulfuric acid in the liquid phase and a sulfate of zinc.

FRANKLIN A. BENT.